United States Patent [19]
Gale

[11] 3,781,665
[45] Dec. 25, 1973

[54] CABLE FAULT LOCATION INDICATOR
[75] Inventor: Philip Franklin Gale, Mold, Wales
[73] Assignee: The Electricity Council, London, England
[22] Filed: July 8, 1971
[21] Appl. No.: 160,754

[30] Foreign Application Priority Data
July 8, 1970 Great Britain............... 33,239/70

[52] U.S. Cl. ............................................. 324/52
[51] Int. Cl. ........................................... G01r 31/10
[58] Field of Search ............................... 324/52, 66

[56] References Cited
UNITED STATES PATENTS
2,315,450  3/1943  Nyquist ................................ 324/52
2,783,434  2/1957  Babler .................................. 324/52
2,794,071  5/1957  Hughes et al. ................... 324/52 X
3,609,533  9/1971  Pardis ................................... 324/52

OTHER PUBLICATIONS
Beckman Instrument Pub. Time Interval Measurements and How to Make Them Received in Pat. Off. 2-10-58 pp. 1-4.

Stringfield et al; Fault Location Methods for Overhead Lines; Proceedings of AIEE Aug. 1957 pp. 518-530

Primary Examiner—Gerard R. Strecker
Attorney—Beveridge & De Grandi

[57] ABSTRACT

A method of, and apparatus for, locating a fault in an underground electrical power cable. The cable is excited to induce resonance between a fault and the end of the cable at which an indicator, comprising a sensor and processing circuitry, is attached. The time interval between successive waves or groups of waves, measured between the zero points of the waves, is used to gate a clock pulse generator into a counter having a visual display. The frequency of the clock pulse generator is arranged such that the reading on the counter is the distance from the indicator to the fault, expressed in metres, and the clock pulse generator is provided, with compensation for the frequency dependence of the velocity of propagation in the cable. Calibration of the indicator may be internal with respect to theoretical value for the velocity of propagation, or on-site, with respect to the actual velocity of propagation.

12 Claims, 7 Drawing Figures

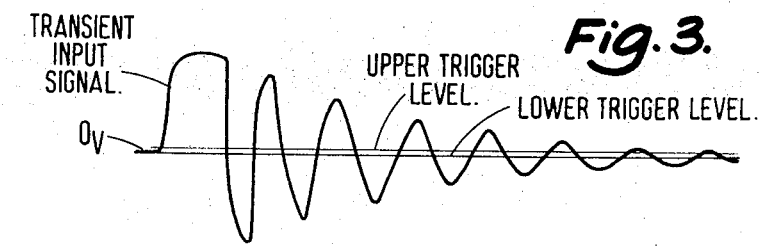
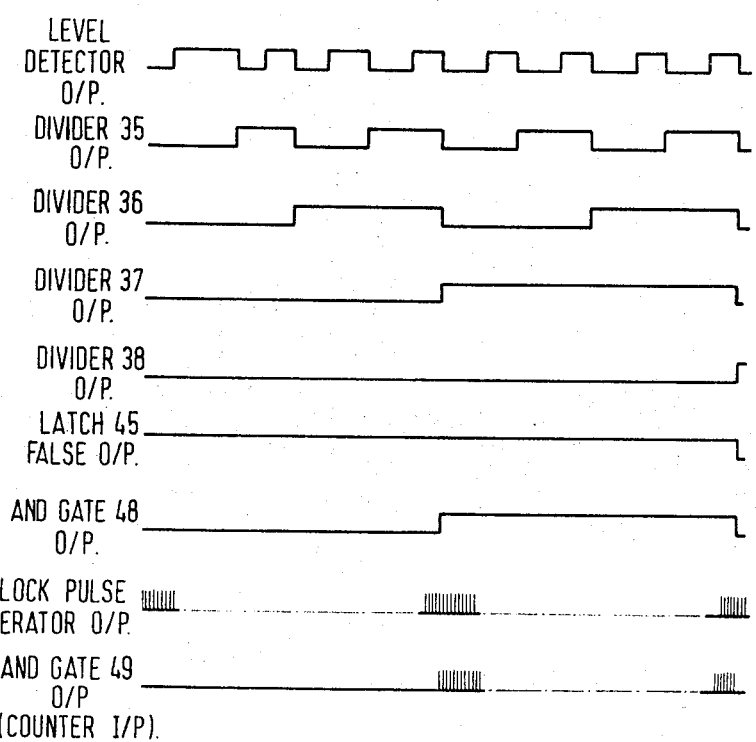
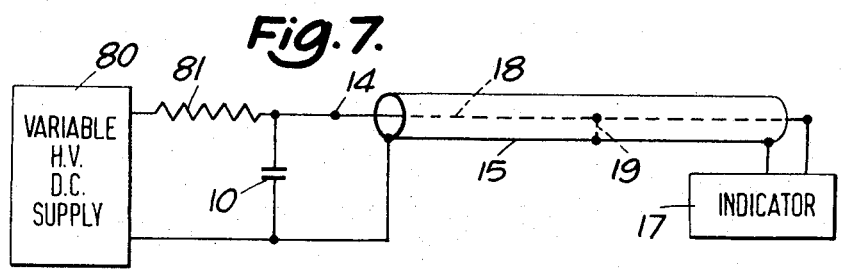

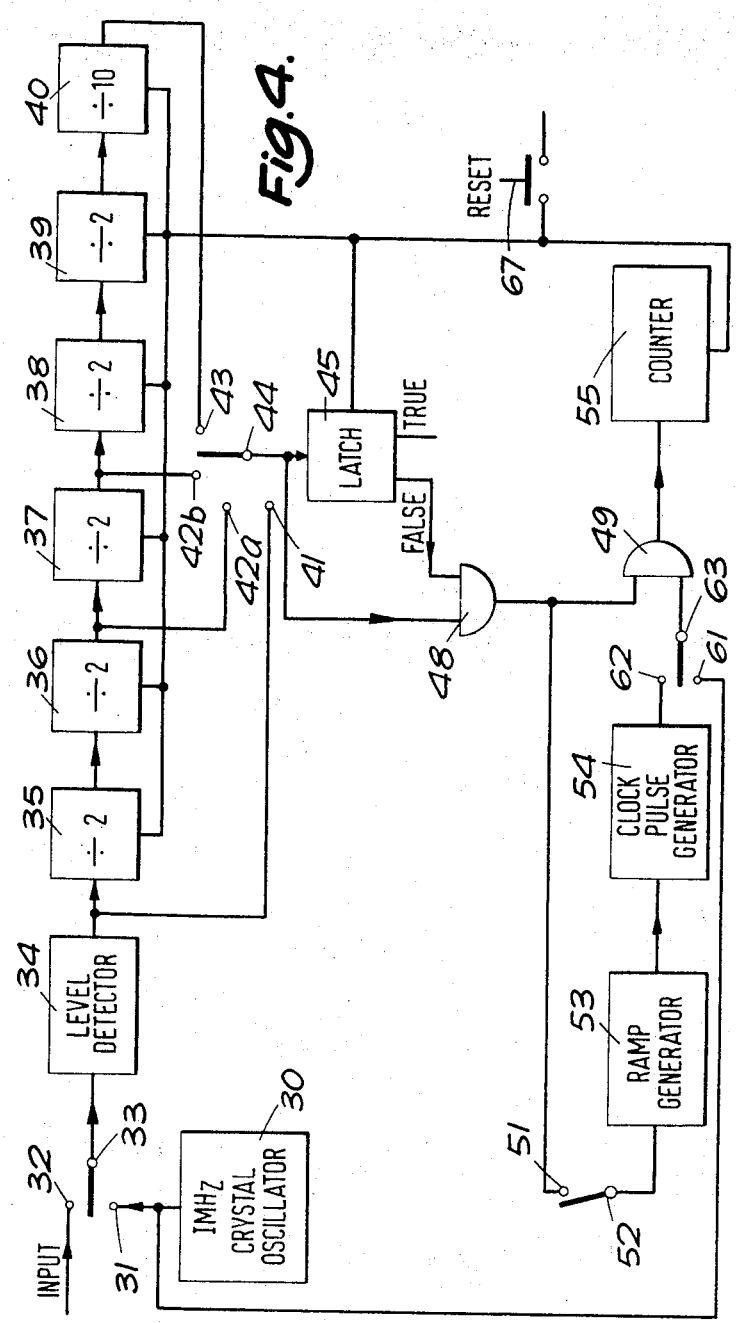

3,781,665

CABLE FAULT LOCATION INDICATOR

BACKGROUND OF THE INVENTION

This invention relates to apparatus for the location of faults in electric cables, and in particular for locating faults in underground power cables.

Cable faults are very diverse in their nature and exhibit widely differing characteristics. Hitherto it has been necessary to have several techniques available since no one technique was suitable for use with all cable faults. Moreover as a result of the amount of equipment presently necessary, it is desirable that an engineer in the field should have considerable experience not only to operate and interpret correctly the particular equipment in use, but also to select initially the most suitable fault location technique.

To make existing techniques more generally applicable auxiliary equipment is used to convert the parameters of a cable fault to certain defined states.

Irrespective of which fault location method is used to make measurements at the terminals of a cable, it is almost always necessary to confirm the precise geographical location of the fault by direct above ground measurements along the cable route. The most frequently used technique for pinpointing the fault position is the acoustic detection of the shock-wave generated at the fault as a result of the flashover caused by a voltage impulse. The impulse is derived from a capacitor discharge generator, which typically uses a capacitor of a few microfarads rated for a voltage of 25kV.

The present invention is directed towards providing an apparatus which is suitable for use with almost every type of cable fault and yet requires a minimum of operator skill.

SUMMARY

According to this invention there is provided a method of locating a fault in an electrical cable comprising the steps of exciting the cable to induce a resonant oscillation in the cable between a test point and the fault and measuring the time interval between successive waves or groups of waves of the resonant oscillation to determine the length of cable between the test point and the fault.

The invention also provides apparatus for locating a fault in an electrical cable comprising means for exciting a resonant oscillation in the cable and means for measuring the time interval between successive waves or groups of waves of the resonant oscillation to determine the length of cable which is resonant.

The invention further provides a cable fault location apparatus comprising level detector means responsive to the zero crossings of an oscillatory waveform, data processing means for indicating the length of that section of cable between the fault and the end to which the level detector means is connected, said processing means being responsive to the time intervals between the zero crossings of the oscillatory waveform detected by the level detector means when said section of cable is resonant, and means for initiating said resonance.

In one arrangement said means for initiating said resonance comprises a capacitor, means for charging the capacitor to a high D.C. potential, and means for connecting the capacitor between two conductive elements of a cable between which a fault exists.

The term conductive element of a cable includes the cable cores and the conductive sheath, and thus the means for initiating said resonance may be connected between two cores or between one core and the sheath.

In another arrangement said means for initiating said resonance comprises a variable frequency oscillator, resonance indicating means (herein generally voltage level detecting means), and means for connecting the oscillator between two conductive elements of a cable between which a fault exists, and to said level detector means.

In yet another arrangement said means for initiating said resonance comprises a variable high voltage D.C. generator, and means for connecting the D.C. generator between two conductive elements of a cable between which a fault exists. This application of a slowly increasing D.C. potential to the cable is called a D.C. pressure test and is useful for locating intermittent faults which do not break down when a voltage impulse is applied. The cable is charged up and left until the fault breaks down thus initiating said resonance.

The level detector means is preferably a voltage comparator having some hysteresis, with the lower trigger level set substantially equal to zero. This provides some noise immunity and results in the output pulses having trailing edges which are directly related to the period of the oscillatory waveform. irrespective of the amplitude of the waveform.

The data processing means conveniently comprises a clock pulse generator having a predetermined frequency, gatably connected to a digital counter and display, and means for producing a first gating pulse for connecting the generator to the counter, said first gating pulse corresponding to the interval between two successive negative-going zero crossings of the oscillatory waveform received by the level detector means.

Preferably said first gating pulse corresponds to a number of said intervals and said predetermined frequency is inversely related to said number such that the number of clock pulses accumulated by the counter during said first gating pulse is substantially equal to the length of said resonant section of the cable expressed in a convenient unit of length.

It will be appreciated that the breakdown of a fault, under the application of a high D.C. potential, creates a voltage step which causes ringing of any part of the cable capable of so doing, for example where the end of the cable is substantially open circuited then the voltage step propagated in that section will be successively reflected between the high impedance open end and the low impedance arc at the fault.

It will also be appreciated that where a fault is continuous and of such a nature as to permit the existence of a node or antinode at the fault when the open end of the cable is driven from the output of a variable frequency oscillator, then resonance of that section of cable between the fault and the driven end can be detected and that the length of the resonant section of cable is related to the frequency of the oscillator.

DESCRIPTION OF THE DRAWINGS

FIG. 3 shows a typical waveform and the corresponding sequence of operation of a data processor of such an apparatus;

FIG. 4 is a circuit diagram an indicator of such an apparatus;

FIG. 7 represents yet another arrangement of an apparatus for locating a fault in an electrical cable.

DETAILED DESCRIPTION

Figure 1:
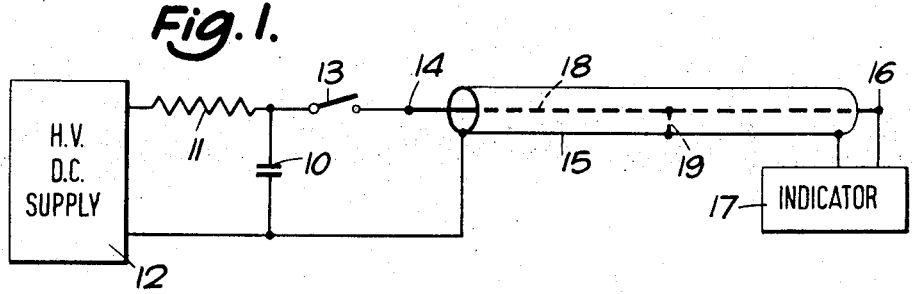
FIG. 1 represents one arrangement of an apparatus for locating a fault in an electrical cable.

Most of the faults found in cables are of the kind where there is inadequate insulation between the conducting cores of a cable or between a core and the earthed shield or screen. These faults have resistances of several hundred ohms up to a few megohms. As shown in FIG. 1 in one arrangement of the fault location system a capacitor 10 can be charged via a resistor 11 from a high voltage D.C. supply 12, and subsequently connected between one end 14 of a conductor 18 in a cable, and the cable shield 15 by means of contactor 13. It is to be understood that use of the apparatus is not limited to applying test voltages between one conductor and the cable shield but includes applying the test voltages between two conductors of a cable. An indicator 17, basically comprising a level detector, data processor and display, is connected between the other end 16 of the conductor 18 and the cable shield 15.

The indicator includes an interface (not shown) of a suitable R-C network as known in the art for attenuating high voltage transients to a level appropriate to the circuitry of the indicator.

When the capacitor 10 is discharged into the conductor 18 a flashover will occur at a fault point 19. This breakdown at the fault point will not coincide with the instant of application of the high voltage across the fault.

When flashover occurs at the fault a transient is set up in that section of the cable between the fault point 19 and the end 16 of the conductor, and the frequency of the transient is a function of the length of that section. A typical transient, shown in FIG. 3, is due to successive reflections of the breakdown impulse between the high impedance open end 16 and the low impedance arc at the fault 19.

The frequency of the transient is given by the equation:

$$f = v/4l \quad (1)$$

where $f$ is the frequency of the transient;

$v$ is the velocity of propagation of electromagnetic waves in the cable dielectric;

and $l$ is the length of cable from the fault 19 to the end to which the indicator 17 is connected.

This equation is only approximate because the velocity of propagation is a function of the frequency. The method of compensation will be described hereinafter.

Figure 2:
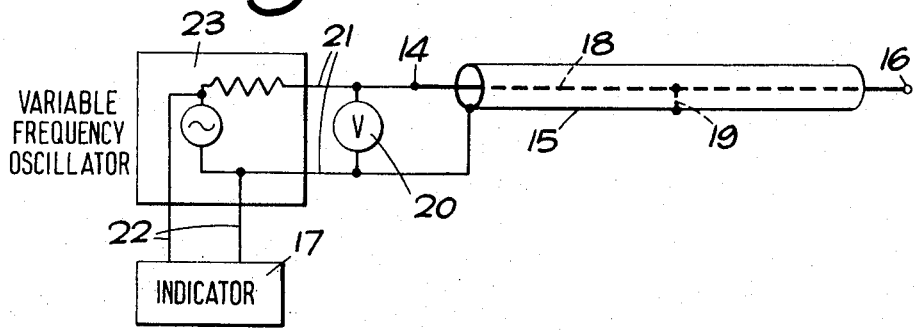
FIG. 2 represents another arrangement of such an apparatus.

Another arrangement of the system is shown in FIG. 2 where a high impedance output 21 of a variable frequency oscillator 23 is connected between one end 14 of a conductor of a cable and the cable shield 15. A high input impedance high frequency voltmeter 20 is connected across the high impedance output terminal of the oscillator. The indicator 17 is connected to a low impedance output 22 of the oscillator, which is merely a convenience avoiding the need for a high power oscillator. This arrangement can be used with two types of fault: those where the fault is continuously low resistance so that its reflection factor is typically in the range −1 to −0.1 (i.e. the fault resistance is less than 4.5Zo, where Zo is the surge impedance of the cable) and those where the fault is an open circuit between the ends 14, 16, in which case the reflection factor is +1. The output voltage of the oscillator as measured by the voltmeter 20 at output terminals 21 will vary as the input impedance of the cable. If the fault is a low resistance, the input impedance of the cable and hence the reading on the voltmeter 20, increases as the frequency of the oscillator is increased up to the point where the cable behaves as a quarter-wave transformer. Increasing the frequency further will cause the input impedance to fall. With the oscillator adjusted to give a maximum reading on the voltmeter the frequency will be given by equation (1) and hence a value of $l$ can be obtained.

In those cases where the fault is an open circuit conductor, the input impedance falls to a minimum at the frequency at which the length of the cable from end 14 to the fault is a quarter of the wavelength in the cable. Hence a value for $l$ can be obtained from equation (1) as before.

In FIG. 7 yet another arrangement is shown for causing the fault 19 to break down. In this arrangement a variable high voltage D.C. generator 80 is connected via resistor 81 to the capacitor 10, which is connected between the end 14 of a cable, and its cable shield 15. An indicator 17 is connected between the other end 16 of conductor 18 of the cable, and the cable shield 15.

The D.C. generator 80 applies an increasing potential to capacitor 10. This is called a D.C. pressure test and is used to locate intermittent faults which do not break down upon application of a voltage impulse. The capacitor 10 is fully charged and left connected to the cable until the fault breaks down.

The circuit of the indicator is given in FIG. 4 and its operation will now be described with reference to the typical waveforms given in FIG. 3.

In FIG. 3 a typical transient waveform is shown, this being applied to a level detector 34 via fixed contact 32 and moving contact 33. The triggering of the detector is adjusted so that the upper trigger level is above zero, so as to provide a degree of noise immunity, and the lower trigger level is equal to zero, so that the trailing edges of the output pulses of the detector 34 correspond to negative going zero crossings of the transient waveform, i.e., the trailing edges are exactly one period apart irrespective of the signal amplitude.

A chain of binary divider stages 35 to 39, followed by a ÷ 10 stage 40, is driven by the output from the level detector 34. The divider chain, counter and all bistable latches are reset prior to a measurement by reset 67.

The output of divider stage 37 is connected via fixed contact 42b and moving contact 44 to bistable latch 45 and to one input of AND gate 48. The false output of latch 45 is fed to the other input of AND gate 48. Latch 45 changes state on the trailing edge of the first pulse from divider stage 37 and thereafter the false output inhibits AND gate 48. Thus the duration of the output pulse from AND gate 48 is exactly equal to four periods of the transient waveform. The high frequency components of the transient waveform are rapidly attenuated after several transits of the wavefront along the cable.

Consequently the distortion due to these high frequency components is negligible by the time the gating period starts.

The gating pulse is fed to AND gate 49 which allows a counter 55 to accumulate pulses from a clock pulse generator 54 via fixed contact 62 and moving contact 63. Rearranging equation (1) gives rise to equation (2).

$$1 = v.t/4 \qquad (2)$$

where $t$ is the periodic time of the transient waveform. Thus, as can be seen from equation (2), the number of clock pulses accumulated by the counter during the gating pulse is directly proportional to the length of cable between the indicator 17 and the fault 19.

The operation of the indicator 17 when used in the arrangement as shown in FIG. 2 will be exactly as described for the transient input waveform, the sequence starting from operation of the reset 67.

The indicator can be calibrated internally provided the velocity of propagation is known. If it is not known then on-site calibration can be used provided that a continuous conductor is available in the faulty cable.

In order that the counter display shall indicate the distance of the fault from the indicator in metres it is arranged that the frequency of the clock pulse generator be adjusted according to a calibration procedure.

Because four periods of the transient waveform are used to gate the counter, equation (2) can be written:

$$1 = v.T/16 \qquad (3)$$

where T is equal to $4t$, and thus to indicate the fault distance in metres the clock pulse frequency must be $v/16$. Where $v$ is typically 160 m/$\mu$s then a clock pulse frequency of 10 MHz is needed. Hence it can be seen that if T is made equal to 16 $\mu$s in equation (3) then $1$, counter display, will be numerically equal to the velocity of propagation $v$.

For internal calibration a 1MHz crystal controlled oscillator 30 is connected via moving contact 33 and fixed contact 31 to the level detector 34, and the latch 45, is connected to the output of divider stage 40 via moving contact 44 and fixed contact 43. Hence the pulse which opens AND gate 49 has a duration of 160 $\mu$s.

The clock pulse generator 54 is now adjusted until the number of pulses accumulated by the counter in 160 $\mu$s is numerically equal to 10 times the velocity of propagation expressed in metres/$\mu$s. Thus the generator can be calibrated to an accuracy of about 1 part in 1,600.

By timing over four consecutive periods of the transient input signal not only are the effects due to any timing errors reduced but the frequency of the clock pulse generator 54 is not inconveniently high.

Figure 5:
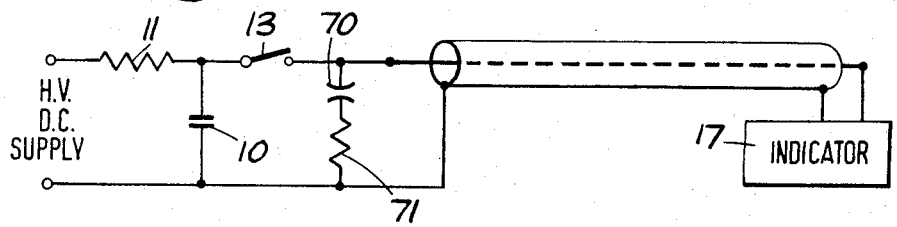
FIG. 5 represents an arrangement of such an apparatus suitable for calibration by comparison with a continuous conductor.

For on-site calibration a spark-gap 70 having a break down voltage of a few kilovolts, is connected in series with a current limiting resistor 71 between a continuous conductor and either the cable shield or another conductor, and the indicator is correspondingly connected between the far end of the conductor and either the cable shield or the other conductor, as shown in FIG. 5, where one conductor and the cable shield are used. When the capacitor 10 is discharged into the spark gap the usual transient appears at the far end.

The clock pulse generator is adjusted until the counter indicates a figure corresponding to the recorded length of the cable. Consequently when testing the faulty conductor, any readings now obtained will be based on this setting, and can be either direct readings or ratio readings depending on how the clock generator was adjusted.

The variable frequency oscillator 23 may be used to calibrate the indicator and on-site calibration must correspond, i.e., if testing between conductors then calibration must be between conductors and if testing between a conductor and the cable shield then calibration must be between a conductor and the cable shield. The variable frequency oscillator 23 is connected between the one end of a continuous conductor and either the cable shield or another continuous conductor, and the frequency of the oscillator adjusted until the complete length of the cable behaves as a quarter-wave transformer. The indicator is then adjusted so that the reading agrees with the recorded length of the cable.

As mentioned hereinbefore the relationship between the periodic time of the signal in the cable and the length of cable is not one of direct proportionality, since $v$, the velocity of propagation, is a function of frequency. The velocity falls from a maximum value, corresponding to the pulse propagation velocity, as the frequency is reduced, since the inductance falls with increasing frequency due to skin and proximity effects, and also the permittivity of the dielectric material falls with increasing frequency.

To compensate for this phenomenon the frequency of the clock pulse generator is swept during the time AND gate 49 is open. The frequency is gradually reduced from a frequency set by the internal calibration method, corresponding to the high frequency propagation velocity, to a frequency determined by the on-site calibration method, since the signal frequency, and hence the velocity of propagation, cannot be lower than this. The accuracy of this compensation can be checked on-site when calibrating the indicator using the variable frequency oscillator. Increasing the frequency of the oscillator, the indicator should read half the known length at half-wave resonance, a third of the known length at three quarter-wave resonance, and so on.

A cable may consist of several different sections joined together, and thus the use of the average velocity of propagation corresponding to quarter-wave resonance of the cable may result in an error in the fault location reading of the indicator. In such a case a more accurate fault location reading can be obtained by calibrating the indicator with the variable frequency oscillator at a frequency such that the calibration reading is about the same as the fault location reading. If the fault lies approximately half-way between $1/n$ th and $1/n+1$ th of the cable from the indicator, where $n$ is an integer and represents a harmonic of the quarter-wave resonance of the cable, then it may be necessary to interpolate in order to obtain a value for the velocity of propagation intermediate the values corresponding to the $n$ th and $(n+1)$th harmonic.

It is possible that none of these calibration methods may be suitable in some circumstances and then the setting of the clock pulse generator must be based on typical figures for the type of cable under examination.

The clock pulse generator is a voltage controlled oscillator, and by suitable choice of the operating point of a variable capacitance diode and a voltage ramp applied from a ramp generator 53, the frequency sweep of the clock pulse generator can be made to compensate for the frequency dependence of the velocity of propagation. The ramp generator is connected to the output of AND gate 48 via moving contact 52 and fixed contact 51.

It is possible that spurious signals may cause the indicator to give an incorrect reading, for instance the fault may flash-over at a low applied voltage causing the peak of the first pulse of the transient input signal to be low, and if the fault is at some considerable distance from the indicator in a particularly lossy cable, then it is possible that the transient will decay too quickly to allow completion of the normal cycle of operation of the indicator. The counter will continue to accumulate pulses until AND gate 49 is inhibited due to spurious signals being received by the level detector. It is also possible that even if the transient signal is otherwise normal, that there may be an associated non-random spurious signal.

Thus to provide a check, the output of divider stage 36 is connected to fixed contact 42a which, when connected to bistable latch 45 via moving contact 44, opens AND gate 49 for the duration of the two periods immediately preceding the four periods normally used to open bistable latch 45. Although these two periods may be distorted because of the presence of high frequency components, it should be clear whether or not the indicator reads approximately half of the normal reading. For those cases where the transient input signal decays too rapidly for normal operation, in order to obtain a fault location reading it may be necessary to double the reading obtained using the output of divider stage 36. In extreme cases it may be necessary to use the output of divider stage 35 in a corresponding manner, and quadruple the indicator reading.

The system can also be used to locate faults on cable systems consisting of one or more teed spurs. Considering the circuit arrangement of FIG. 6, due to the presence of fault 79, when impulsing from end 75 the signals at all ends except end 78 will exhibit large D.C. content. Typical transient waveforms are shown as might be observed at the cable ends. Whilst such waveforms would probably not cause the indicator to operate it is possible that, if operated, a wrong indication might be given. Accordingly the indicator can be arranged to indicate the duration of the first pulse received by the level detector.

The output of the level detector 34 is connected via fixed contact 41 and can be connected via moving contact 44 to open AND gate 48 for the duration of the first pulse only. The $1MH_z$ oscillator 30 can be connected to AND 49 via fixed contact 61 and moving contact 63 so that the pulse duration is displayed in $\mu$seconds.

Figure 6:
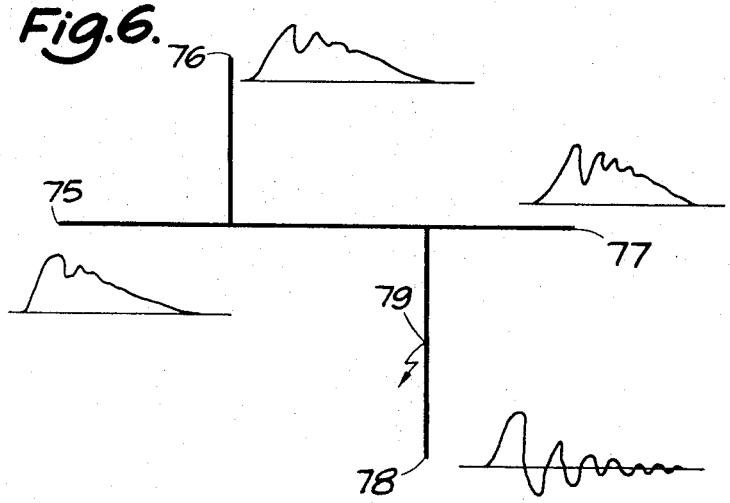
FIG. 6 represents typical transient waveforms observable in a teed cable.

If, on a teed system such as shown in FIG. 6, appreciable D.C. content was only detected only at end 76, and readings, probably not in agreement, obtained at ends 77, 78, the fault would lie in the section of cable between the two tee joints. Under these circumstances it would be necessary to open up the cable at the second tee joint and connect the indicator to the faulty part of the cable at this point. This procedure would only be necessary on infrequent occasions since teed systems are not very widely used.

It is envisaged that the apparatus could form part of an automatic system installed, for example, in electricity substations, to locate and record intermittent flashing faults.

I claim:

1. A method of locating a fault in an electrical cable comprising the steps of breaking down the fault by applying at one end of the cable, a substantially D.C. voltage between two conductive elements of the cable between which the fault exists; receiving at the opposite end of the cable the oscillatory waveform established between said two conductive elements as a result of successive reflections at the fault, and at said opposite end, of a travelling electromagnetic wave generated by the breakdown of the fault; detecting and discarding n, where n is a positive integer, successive half-cycles of the oscillatory waveform starting from the first zero-crossing of the waveform; detecting the occurrence of the next m successive cycles thereafter; obtaining a measure of the time interval, T, of said m successive cycles, where m is a positive integer; and processing said time interval T in accordance with the expression $1 = v.T/4m$, where $v$ is a predetermined value for the velocity of electromagnetic waves in the cable, in order to derive a value for the distance, 1, of the fault from said opposite end of the cable.

2. A method as recited in claim 1 wherein the processing step is performed by gating a clock pulse generator into a counter for the period T, and, for compensating for a known frequency dependence of the velocity of propagation of electromagnetic waves in the cable, including the further step of reducing the frequency of the generator in a predetermined manner from the start of the gating period.

3. An apparatus for locating a fault in an electrical cable, comprising means for generating and applying, at one end of the cable, a substantially D.C. voltage between two conductive elements of the cable between which the fault exists, in order to break down the fault; signal detecting means connectible, at the opposite end of the cable, between the two conductive elements, and providing an output signal corresponding substantially to the zero crossings of the oscillatory waveform established between said two conductive elements as a result of successive reflections at the fault of a travelling electromagnetic wave generated by the break down of the fault; signal processing means responsive to said output signal and including means for detecting and discarding n half-cycles of the oscillatory waveform, where n is a positive integer, starting from the first zero-crossing of the waveform, means detecting the occurrence of the next m successive cycles, means for obtaining a measure of the time interval, T, of said m successive cycles, where m is a positive integer, and means for deriving a value for the distance, 1, of the fault from said opposite end of the cable in accordance with the expression $l = v.T/4m$, where $v$ is a predetermined value for the velocity of electromagnetic waves in the cable.

4. Apparatus as recited in claim 3 wherein the means for deriving a value for the distance $l$ includes a clock pulse generator having a frequency of $v/4m$, where $v$ is expressed in a convenient unit of length, a digital counter and display, gating means gatably connecting the generator to the digital counter, and wherein the means for obtaining a measure of the time interval T provides a gating pulse for controlling said gating means to connect the generator to the digital counter for a period equal to said time interval T whereby the number of clock pulses accumulated by the digital counter and displayed on the display is numerically equal to the distance $l$.

5. Apparatus as recited in claim 4 wherein the counting means includes a binary divider having a plurality of stages for counting the cycles of the oscillatory waveform, and wherein the means for obtaining a measure of the time interval T includes a bistable latch and an AND gate, the output from the appropriate divider stage being fed to said bistable latch and to said AND gate, and the false output of said bistable latch also being fed to said AND gate, the output of said AND gate being said gating pulse, which gating pulse corresponds to the groups of cycles $n = 2^p-1$, $m = 2^p$, where $p$ is a positive integer.

6. Apparatus as recited in claim 4 wherein there is provided internal calibration means for calibrating the signal processing means with respect to the predetermined value of the velocity of propagation of electromagnetic waves in the cable, which internal calibration means comprises a controlled oscillator connectible to the input of said signal detecting means, and having a predetermined frequency, and means for producing a calibration gating pulse for connecting said generator to said digital counter, the calibration gating pulse corresponding to $4m \times 10^p$, where $p$ is 0, 1, 2, etc., multiplied by the time unit in which said velocity of propagation is expressed, the frequency of said generator being adjustable such that the number of clock pulses accumulated by the digital counter during the calibration gating pulse can be made substantially equal to $10^p$ times said velocity of propagation.

7. Apparatus as recited in claim 4 wherein the means for generating and applying the substantially D.C. voltage comprises a capacitor, means for charging the capacitor to a high D.C. potential, and means for connecting the capacitor between two conductive elements of a cable, and including, for calibrating the processing means with respect to the actual velocity of propagation of electromagnetic waves in the cable, capacitor discharge means connectible between two conductive elements of the cable between which a fault does not exist, and also connectible across the capacitor such that the capacitor discharge initiates an oscillatory waveform in the cable, and wherein the clock pulse generator is adjustable so that with the signal detecting means connected between these last-mentioned conductive elements, the display can be made to indicate the recorded length of these last-mentioned conductive elements.

8. An apparatus as recited in claim 7 wherein said capacitor discharge means comprises a spark-gap connected in series with a current limiting resistor, the spark-gap having a break down voltage of a few kilovolts.

9. An apparatus as recited in claim 4 wherein the signal processing means includes frequency controlling means connectible to said clock pulse generator during said gating pulse to reduce the frequency of the generator in a predetermined manner in order to compensate for the frequency dependence of the velocity of propagation of electromagnetic waves in the cable.

10. An apparatus as recited in claim 9 wherein the generator comprises a voltage controlled oscillator and the frequency controlling means comprises a voltage ramp producing circuit.

11. An apparatus as recited in claim 3 wherein the means for deriving a value for the distance, 1, includes a counter, a clock pulse generator having a controllable pulse repetition frequency, means for gating the pulses from the generator into the counter for a period T; and wherein there is provided frequency controlling means connectible to the generator during the gating period for reducing the frequency of the generator in a predetermined manner in order to compensate for the frequency dependence of the velocity of propagation of electromagnetic waves in the cable, such that the number of pulses accumulated in the counter correspond to the distance from the fault to said opposite end of the cable.

12. Apparatus as recited in claim 11 wherein the generator comprises a voltage controlled oscillator and the frequency controlling means comprises a voltage ramp producing circuit.

* * * * *